Figure 1:
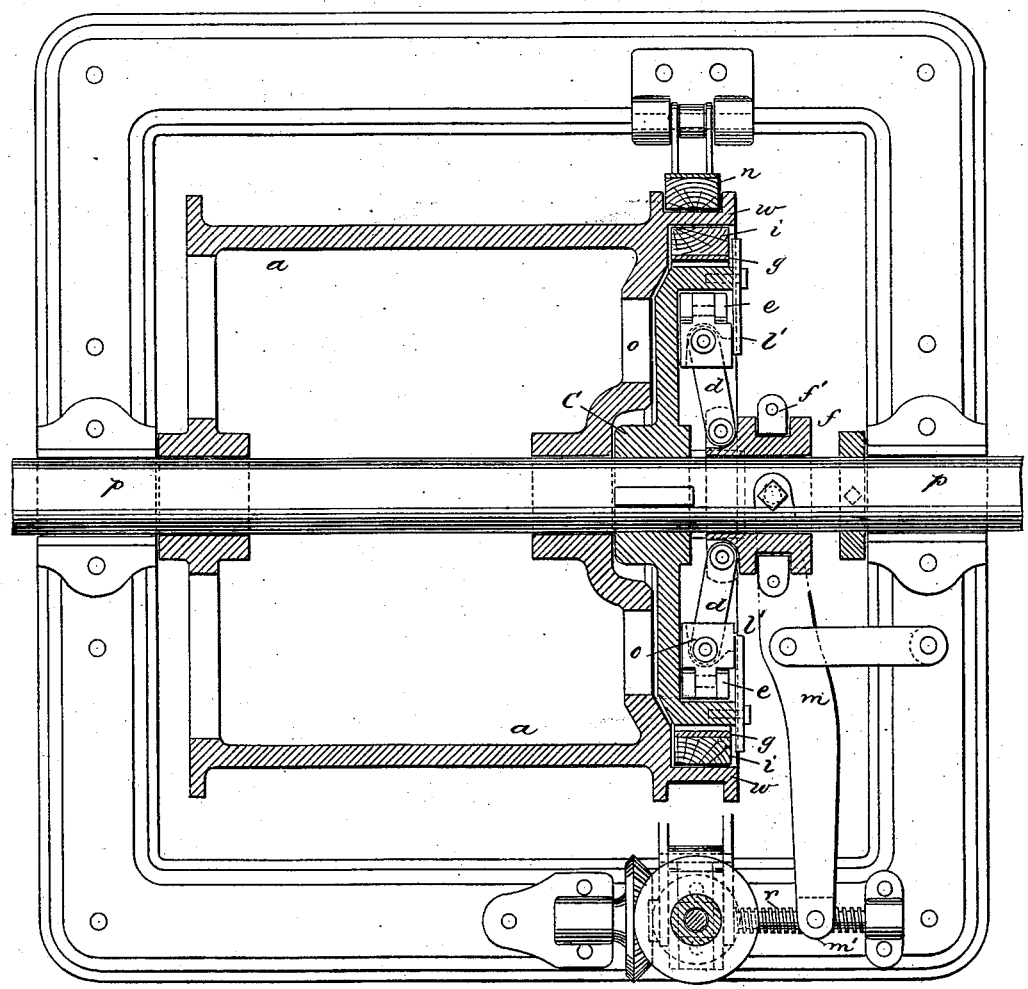

(No Model.) 2 Sheets—Sheet 1.

D. H. MERRITT.
Friction Clutch and Brake.

No. 237,570. Patented Feb. 8, 1881.

WITNESSES:
Jno. E. Gavin
Chas. M. Higgins.

INVENTOR:
Daniel H. Merritt
by S. H. Walker
Attys.

N. PETERS, PHOTO-LITHOGRAPHER, WASHINGTON, D. C.

(No Model.) 2 Sheets—Sheet 2.
D. H. MERRITT.
Friction Clutch and Brake.
No. 237,570. Patented Feb. 8, 1881.
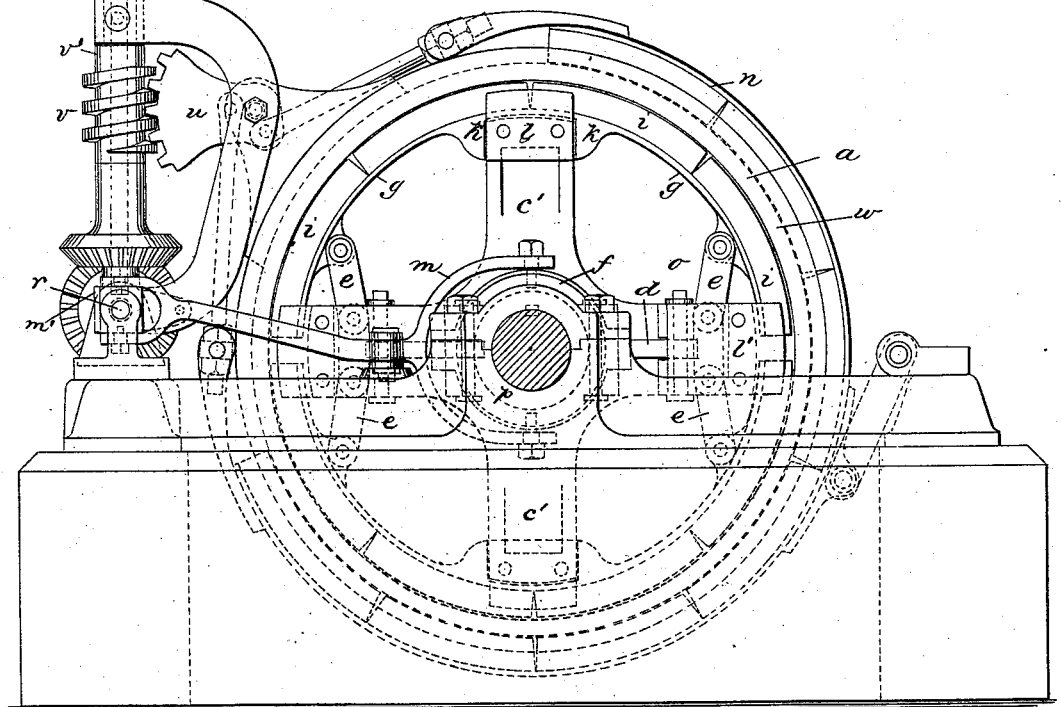
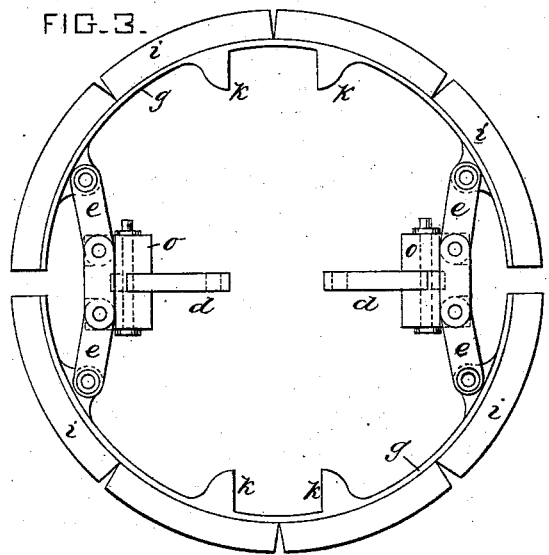
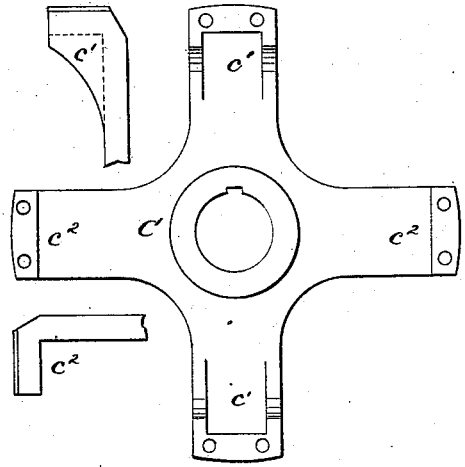
WITNESSES:
INVENTOR:
Daniel H. Merritt

UNITED STATES PATENT OFFICE.

DANIEL H. MERRITT, OF MARQUETTE, MICHIGAN.

FRICTION CLUTCH AND BRAKE.

SPECIFICATION forming part of Letters Patent No. 237,570, dated February 8, 1881.

Application filed June 24, 1880. (No model.)

*To all whom it may concern:*

Be it known that I, DANIEL H. MERRITT, of Marquette, in the county of Marquette and State of Michigan, have invented certain new and useful Improvements in Friction Clutches and Brakes for Hoisting and other Machinery, of which the following is a specification.

My invention relates to that class of friction-clutches employing a friction-band expanded by toggles against the interior of a friction-rim on the winding-drum or other part griped by the clutch; and my invention aims to provide a clutch of this kind which shall be simple, safe, and durable, and in which the driving or revolving strain shall be applied to the friction-band independent of the devices used for expanding the same.

My invention also aims to render the arrangement of the friction brake and clutch upon the winding-drum more simple and compact.

To these ends the main features of my invention may be stated to consist in the combination, with the friction-band, of an armed driving-hub having distinct arms, making a driving connection with the band, and distinct arms supporting the expanding devices thereof without transmitting the driving-strain through these devices; also, in a double-faced friction-rim upon the winding-drum, or equivalent driven part, with a brake-band arranged to engage its exterior surface and the clutch-band arranged to engage its inner surface.

My invention also embodies minor features, as hereinafter set forth.

Figure 1 of the annexed drawings presents a sectional plan view of a hoisting-machine embodying my improvements, and Fig. 2 an end elevation thereof. Fig. 3 is an end view of the armed driving-hub removed, and Fig. 4 is a similar view of the friction-clutch band and its expanding-toggles.

In Figs. 1 and 2 $p\ p$ indicate the driving-shaft, to which power is applied, and $a$ the winding-drum, which is loose thereon. One end of this winding-drum is formed with a friction-rim, $w$, which has a finished face on both its outer and its inner sides. The outer face has projecting marginal flanges, and a brake-band, $n$, lies between the flanges and encircles the outer face of the rim, as shown.

The opposite ends of this brake-band are connected by adjustable rods to opposite arms of a lever or toothed segment, $u$, which has a segment of worm-teeth on its long arm, which mesh with a worm, $v$, on a hollow spindle, $v'$, which is operated by the band-wheel $s$, by turning which one way or the other the band may be contracted to stop the motion of the drum, or loosened to permit the free rotation thereof. This brake, as will be readily understood, is used in unwinding to regulate the descent of the load, or to stop the load or the unwinding motion at any point. Now, the end of the drum from which the friction-rim projects is recessed, and in the recess is arranged the armed driving-hub C, which is keyed to and revolves with the driving-shaft. This armed hub carries a friction-clutch band, $i\ g$, which also lies in the recess of the drum, and when expanded engages the inner face of the friction-rim, and when relaxed revolves clear of the same in a noiseless manner. The friction-band is formed of a wrought-iron band, $g$, on the outside of which wooden segments or shoes $i$ are fixed, and this band is formed in two semicircular sections, which are joined across the divisions by toggles $e\ e$, which connect to sliding blocks $o\ o$, which blocks are connected, by radial toggle-bars $d\ d$, to a sliding collar, $f$, loose on the driving-shaft, so that hence when this collar is slid inward the several toggles will be straightened and the friction-band expanded against the rim of the drum, thus firmly clutching the drum with the shaft, and when the collar is slid outward the action will be reversed and the clutch released.

The driving-hub C has preferably four radial arms $c'\ c^2$ arranged at right angles to each other, and having rectangular projections on their ends extending outwardly. (See Figs. 1 and 4.) Two of these arms, $c'\ c'$, opposite each other, are engaged with the friction-band, each at the middle of each section thereof, the projections of the arms fitting snugly between lugs $k$, formed on the iron portion of the band, (see Figs. 2, 3, and 4,) and the driving-strain is applied from the driving-hub to the friction-band solely through the engagement of these arms with the said lugs. The other two arms, $c^2$, of the driving-hub extend toward the divisions of the friction-band and rest under the sliding blocks of the expanding-toggles, and a plate, $l'$, is fastened to the projection of these arms, and extends over the sliding toggle-blocks, and also partly over the approaching ends of the bands, and serves to guide the sliding blocks, and also to prevent the displacement of the band or its toggle mechanism outward. Similar but smaller plates $l$ are fastened on the projections of the driving-arms $c'$, and extend partly over the middle portion of each section of the friction-band to hold the same in place.

It will now be seen that the driving-hub has no connection in the direction of rotation with the expanding-toggles of the friction-band, and hence no driving-strain is applied through the same; but all this strain is transmitted through the driving-arms $c'$ $c'$ and the engaging-lugs $k$. Therefore the expanding mechanism is not liable to become cramped, twisted, or deranged by a heavy driving-strain, but it always remains in an easy working and sensitive condition, its sole function thus being to expand or contract the band, which actions may hence be effected in a more instantaneous and perfect manner than can be the case where the driving-strain is conveyed through the same device which expands or contracts the band.

The movement of the sliding collar $f$ in or out to effect the expanding or contracting or clutching or unclutching action of the friction-clutch band is effected by the forked lever $m$, which is swiveled to a ring, $f'$, engaged in a groove in the sliding collar, and its opposite arm is swiveled to a nut, $m'$, which is impelled to or fro by a screw, $r$, which is driven by bevel-gearing from a hand-wheel, $t$, the shaft of which passes through the hollow spindle of the worm $v$, which operates the brake-band. It will thus be seen that the mechanism for operating the brake and clutch are arranged on the same axis, and that the hand-wheels $t$ $s$ are closely adjacent to each other, so that the hand can change immediately from the brake-wheel to the clutch-wheel to release the brake and throw the clutch into action, or vice versa, or so that one hand can release the brake while the other throws the clutch into action simultaneously, or the reverse, thus rendering the operation of the machine very quick, easy, and safe. It will be further seen that as the brake-wheel and clutch-wheel have the same axis, and the brake and clutch act on the same friction-rim, the construction is thus rendered very compact.

It may be perceived that for the purposes of the invention it is immaterial whether the drum $a$ be the driver or the driven, or whether the part engaged by the clutch be a winding-drum pulley or shaft-coupling, or whether the apparatus be employed as a clutch or as a brake.

To adjust the brake-band or the expanding mechanism thereof to make up for wear, I dispense with the use of set-screws, which are objectionable in being liable to loosen or to be badly adjusted, and I employ instead exchangeable toggle-links $e$ or $d$ of slightly-varying lengths, so that one may be removed and others inserted in a quick and easy manner, thus providing the necessary adjustment in a more certain manner.

What I claim is—

1. The combination, with a friction-band formed in two halves, of the four-armed driving-hub C, having two arms making a driving connection with the said halves, together with the expanding-toggles $e$, and sliding blocks $o$, supported but not connected with the other arms of the said armed hub, and a means for actuating said expanding-toggles, substantially as herein shown and described.

2. The combination, with the expanding and contracting friction-clutch band, formed in halves, and having the opposite engaging-lugs $k$ $k$, of the four-armed driving-hub C, having the driving-arms $c'$, adapted to engage with said lugs, sliding collar $f$, toggles $d$, sliding blocks $o$, and toggles $e$, substantially as described, and for the purpose set forth.

3. The combination, with the expanding and contracting friction-clutch band having the opposite lugs $k$, of the four-armed driving-hub C, having the driving-arms $c'$, sliding collar $f$, toggles $d$, sliding blocks $o$, toggles $e$, and plates $l$ $l'$, secured to the arms of the driving-hub, and extending over the clutch-band and toggles, substantially as described, and for the purpose set forth.

4. The combination, with the drum $a$, provided with a friction-rim, $w$, having a recess both on its outer and inner surface, of the brake-band $n$, arranged to engage with the outer face thereof, and a clutch-band, operated substantially as set forth, to engage with the inner face thereof, substantially as described, and for the purpose set forth.

5. The combination, with the friction-clutch band, of the four-armed driving-hub band C, sliding collar $f$, toggles $d$ and $e$, forked lever $m$, nut $m'$, and screw $r$, operated as set forth, substantially as described, and for the purpose set forth.

DANIEL H. MERRITT.

Witnesses:
M. H. MAYNARD,
A. F. MAYNARD.